United States Patent
Ito et al.

[11] Patent Number: 5,914,180
[45] Date of Patent: *Jun. 22, 1999

[54] MAGNETIC RECORDING MEDIUM

[75] Inventors: Jota Ito; Takashi Chiba; Kenichi Sato; Hidetoshi Honda; Toshiharu Uchimi; Taketoshi Sato; Yukihiro Koshika; Yasumi Sato, all of Miyagi, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/531,703

[22] Filed: Sep. 21, 1995

[30] Foreign Application Priority Data

Sep. 22, 1994 [JP] Japan .................... 6-227844

[51] Int. Cl.⁶ ........................ G11B 5/66
[52] U.S. Cl. ............ 428/213; 428/336; 428/694 T; 428/694 TM; 428/694 TP; 428/694 TC; 428/900
[58] Field of Search .............. 428/694 T, 694 TP, 428/694 TM, 694 TR, 65.3, 65.5, 64.2, 213, 900, 336; 369/283, 286

[56] References Cited

U.S. PATENT DOCUMENTS

| | | | |
|---|---|---|---|
| 4,124,736 | 11/1978 | Patel et al. ........................ | 428/622 |
| 4,565,734 | 1/1986 | Arai et al. ........................ | 428/216 |
| 4,596,735 | 6/1986 | Noguchi et al. ........................ | 428/215 |
| 4,766,034 | 8/1988 | Sato et al. ........................ | 428/336 |
| 4,824,539 | 4/1989 | Komoda et al. ........................ | 204/192.2 |
| 4,855,175 | 8/1989 | Wakai et al. ........................ | 428/148 |
| 4,865,916 | 9/1989 | Yamaura et al. ........................ | 428/336 |
| 4,994,321 | 2/1991 | Nagao ........................ | 428/336 |
| 5,686,177 | 11/1997 | Yamanaka et al. ........................ | 428/332 |

FOREIGN PATENT DOCUMENTS

| | | |
|---|---|---|
| 0 567 657 A1 | 11/1992 | European Pat. Off. . |
| 57-020920 | 2/1982 | Japan . |
| 61-280021 | 12/1986 | Japan . |

*Primary Examiner*—Stevan A. Resan
*Attorney, Agent, or Firm*—Hill & Simpson

[57] ABSTRACT

A magnetic recording medium having a thin magnetic metal film formed by vapor deposition under an atmosphere of an introduced oxygen gas. The thickness of the surface oxide film having the degree of oxidation of 50% or higher is maintained so as to be not higher than 5% of the total film thickness of the thin magnetic metal film. The magnetic recording medium is affected to a lesser extent by the surface oxide layer such that it is superior in magnetic properties, such as coercivity, and in electromagnetic properties.

6 Claims, 4 Drawing Sheets

MAGNETIC RECORDING MEDIUM

BACKGROUND OF THE INVENTION

This invention relates to a magnetic recording medium and, more particularly, to an evaporated type magnetic recording medium.

In the field of a video tape recorder etc., there is recently raised a strong demand for high density recording for achieving high picture quality. In keeping up therewith, there is proposed a thin magnetic metal film type magnetic recording medium in which a magnetic metal material or a magnetic alloy material, such as CoNi, is directly deposited on a non-magnetic substrate by plating or vacuum thin film forming technique, such as vacuum deposition, sputtering or ion plating.

The thin magnetic metal film type magnetic recording medium has a number of advantages, such that it is superior in coercivity, rectangular ratio and electro-magnetic conversion characteristics in a short wavelength range and lends itself to reduction in thickness of the magnetic layer and to increased packing density of the magnetic material since there is no necessity of mixing the non-magnetic material, such as a binder, in a magnetic layer, as in the case of a coated magnetic recording medium.

In particular, the evaporated type magnetic tape, or the evaporated tape, which has its magnetic layer formed by the vacuum deposition method, is commercialized as a high-band 8 mm tape or a digital micro-tape, such as a non-tracking (NT) tape, since it has high production efficiency and stable characteristics.

In the above-described evaporated tape, the magnetic layer is formed by vacuum deposition which is carried out in such a manner that a magnetic material as a source of evaporation is irradiated under vacuum with electronic rays so as to be converted into metal vapor which is then deposited on the non-magnetic substrate. In this case, the general practice is to introduce an oxygen gas into the atmosphere of vapor deposition for oxidizing part of the metal vapor for controlling magnetic characteristics, such as coercivity or saturation magnetic flux density of the magnetic layer.

FIG. 1 shows the constitution of a vapor deposition apparatus in which vapor deposition is carried out while introducing oxygen into the vapor deposition atmosphere.

The vapor deposition apparatus includes a vacuum chamber 30 maintained at high vacuum and accommodating a feed roll 31 and a take-up roll 32 therein. A tape-shaped non-magnetic substrate 33 is adapted for travelling from the feed roll 31 to the take-up roll 32.

At a mid portion of a travel path of the non-magnetic substrate 33 from the feed roll towards the take-up roll 32 is mounted a cooling can 34 larger in diameter than the rolls 31, 32. The cooling can 34 is positioned for pulling the non-magnetic substrate 33 towards below in FIG. 1.

Thus the non-magnetic substrate 33 is sequentially reeled out from the feed roll 31 so as to be guided around the peripheral surface of the cooling can 34 before being taken up on the take-up roll 32.

Within the vacuum chamber 30, a crucible 35 filled with a magnetic metal material 38 as a source of evaporation is mounted below the cooling can 34. On the inner side wall of the vacuum chamber 30 is mounted an electron gun 16 for heating and evaporating the magnetic metal material 38 filled in the crucible 35. The electron gun is oriented for radiating electron rays therefrom to the magnetic metal material 38 contained n the crucible 35. The magnetic metal material 38, evaporated by the electron gun, is deposited as a magnetic layer on the non-magnetic substrate 33 adapted for running at a constant velocity around the peripheral surface of the cooling can 34.

Between the cooling can 34 and the crucible 35, there is mounted a shutter in the vicinity of the cooling can 34. The shutter 36 is formed for covering a pre-set area of the non-magnetic substrate 33 adapted for travelling on the peripheral surface of the cooling can 34. The magnetic metal material 38, evaporated by the shutter 36, is deposited obliquely within a pre-set angular extent on the non-magnetic substrate 33.

With the present vacuum deposition apparatus, an oxygen gas inlet 37 is provided through the sidewall section of the vacuum chamber 30. The oxygen gas inlet 37 is provided in close proximity to the cooling can 34 between the shutter 36 and the cooling can 34, that is at a position spaced apart from the magnetic metal material 38 operating as an evaporation source.

Part of the metal vapor from the vaporization source and travelling past the shutter is oxidized by the oxygen gas supplied via the oxygen gas inlet 37 so as to be deposited on the surface of the non-magnetic substrate 33.

The thin magnetic metal film, formed by the above-described oxidation process, tends to be higher in coercivity and lower in saturation magnetization than the thin magnetic metal film which has not passed through the oxidation process. Thus the magnetic properties may be adjusted by controlling the amount of oxygen introduced via the oxygen gas inlet.

The oxygen inlet is provided between the shutter and the cooling drum in order to prevent the oxygen gas inlet from being directly exposed to the metal vapor from the vaporization source by the shutter. If the oxygen gas inlet is directly exposed to the metal vapor, the latter tends to be affixed to the oxygen gas inlet thus obstructing normal introduction of the oxygen gas.

In view of uniforming the quantity of the introduced oxygen gas in a direction along the width of the non-magnetic substrate, a number of inlet tubes of small diameters are placed in parallel along the width of the non-magnetic substrate, or an inlet tube having a uniform cross-sectional shape along the width of the non-magnetic substrate is employed.

If the thin magnetic film formed by the above-described vacuum deposition apparatus is analyzed as to its oxygen concentration by e.g., the Auger electron spectroscopic method, it is found that the degree of oxidation in the thin film is not uniform but is significantly partialized towards its surface layer. In the case of a thin magnetic metal film having a thickness of 200 nm, its surface layer with a thickness ranging from 16 to 28 nm represents a surface oxide layer exhibiting an extremely high oxidation degree. Heretofore, the presence of the surface oxide layer was felt to raise magnetic characteristics, such as coercivity, of the magnetic layer, and to improve its weatherability.

However, the results of our investigations have revealed that the surface oxide layer does not necessarily contribute to improving magnetic properties, such as coercivity, but may impair electro-magnetic conversion characteristics, because the magnetic properties have been deteriorated in such surface layer.

SUMMARY OF THE INVENTION

It is therefore an object of the present invention to provide a magnetic recording medium superior in magnetic properties, such as coercivity, and capable of exhibiting good electro-magnetic conversion characteristics.

According to the present invention, there is provided a magnetic recording medium having a thin magnetic metal film deposited on a non-magnetic substrate by vapor deposition under an atmosphere of an introduced oxygen gas, wherein the thin magnetic metal film has a surface oxide layer having the oxidation degree of 50% or higher, with the surface oxide layer having a thickness which accounts for not more than 5% of the total thickness of the thin magnetic metal film.

If the magnetic layer is made up of a plurality of thin magnetic metal films, each surface oxide layer on each thin magnetic metal film, having an oxidation degree of 50% or higher, has a thickness which accounts for 5% or less of the total thickness of the thin magnetic metal film.

A protective layer composed of an inorganic substance may be formed on the magnetic layer.

The coercive force may be 1000 Oe or higher, while the rectangular ratio may be 60% or higher.

The magnetic recording medium encompassed by the present invention is an evaporated or vapor-deposited magnetic tape, that is a magnetic tape in which a thin magnetic metal film as a magnetic layer is deposited by a vapor deposition method.

With the vapor deposited magnetic recording medium, vapor deposition for forming the thin magnetic metal film is carried out in such a manner that an oxygen gas inlet is arranged between a magnetic material as an evaporation source and a non-magnetic substrate on which to deposit the magnetic material. Part of the magnetic material which has turned into a metal vapor is oxidized by an oxygen gas effluent from the oxygen gas inlet.

Although the thin magnetic metal film, thus formed, contains the oxygen gas, its oxygen gas distribution is not uniform, such that the oxidation degree in the surface layer portion is high and is 50% or higher in contrast to the oxidation degree of 30% or less in the inside region of the film. With the thin magnetic metal film, the oxidation degree on the order of 30% is favorable in improving magnetic properties, such as coercivity. However, the oxidation degree of 50% or higher deteriorates the magnetic properties and impairs the electro-magnetic conversion performance of the recording medium.

According to the present invention, the thickness of the surface oxide layer, having the oxidation degree of 50% or higher, is controlled to be 5% or less of the total thickness of the thin magnetic metal film. If the surface oxide layer portion with deteriorated magnetic performance is limited to this range, it becomes possible to suppress the spacing loss otherwise caused by the surface oxide layer and to improve the electro-magnetic conversion performance significantly.

With the magnetic recording medium according to the present invention in which a thin magnetic metal film is deposited by vapor deposition under an atmosphere of an introduced oxygen gas, the thickness of the surface oxide layer having the oxidation degree of 50% or higher is kept to be 5% or less of the total thickness of the thin magnetic metal film, whereby the magnetic recording medium is affected to a lesser extent by the surface oxide layer such that the magnetic recording layer is excellent in magnetic properties such as coercivity and in electro-magnetic conversion characteristics.

DETAILED DESCRIPTION OF THE PREFERRED EMBODIMENTS

Figure 1:
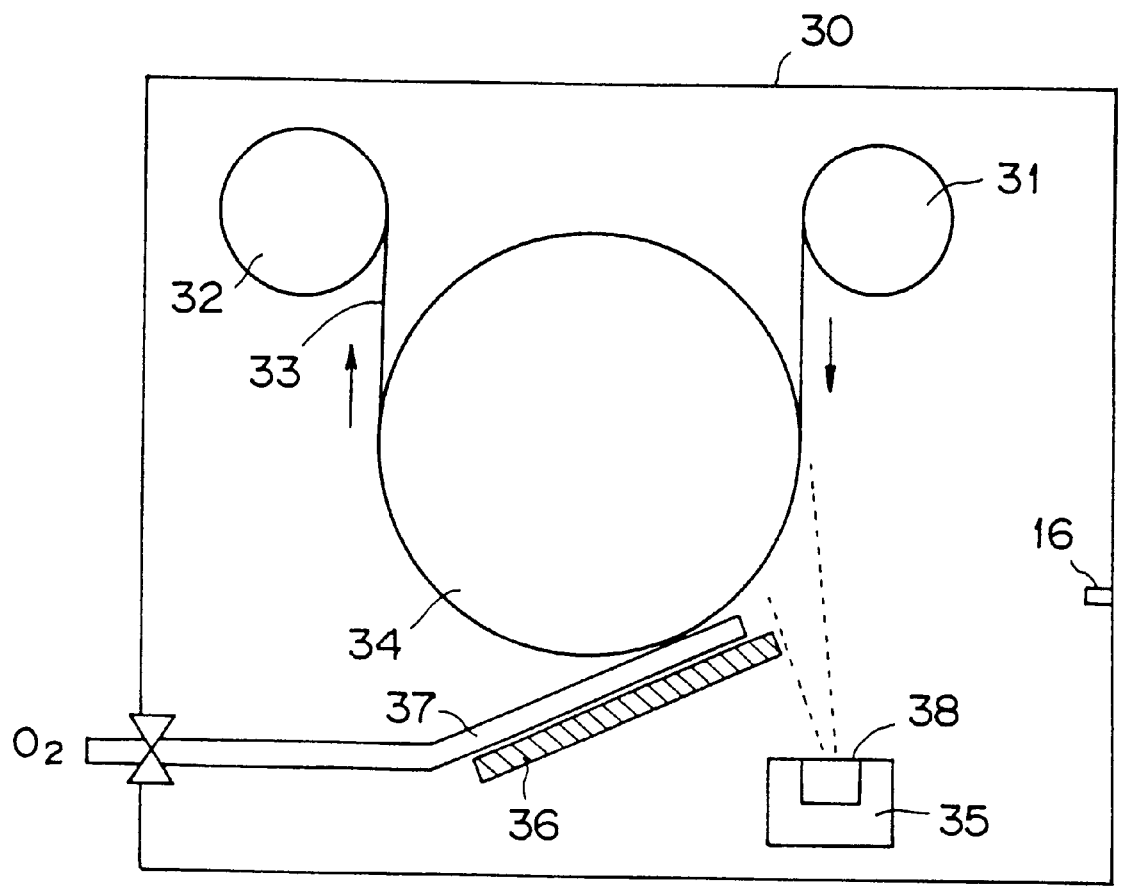
FIG. 1 is a schematic view showing an vapor deposition apparatus employed in the preparation of a conventional magnetic recording medium.

Referring to the drawings, preferred embodiments of the present invention will be explained in detail.

Figure 2:
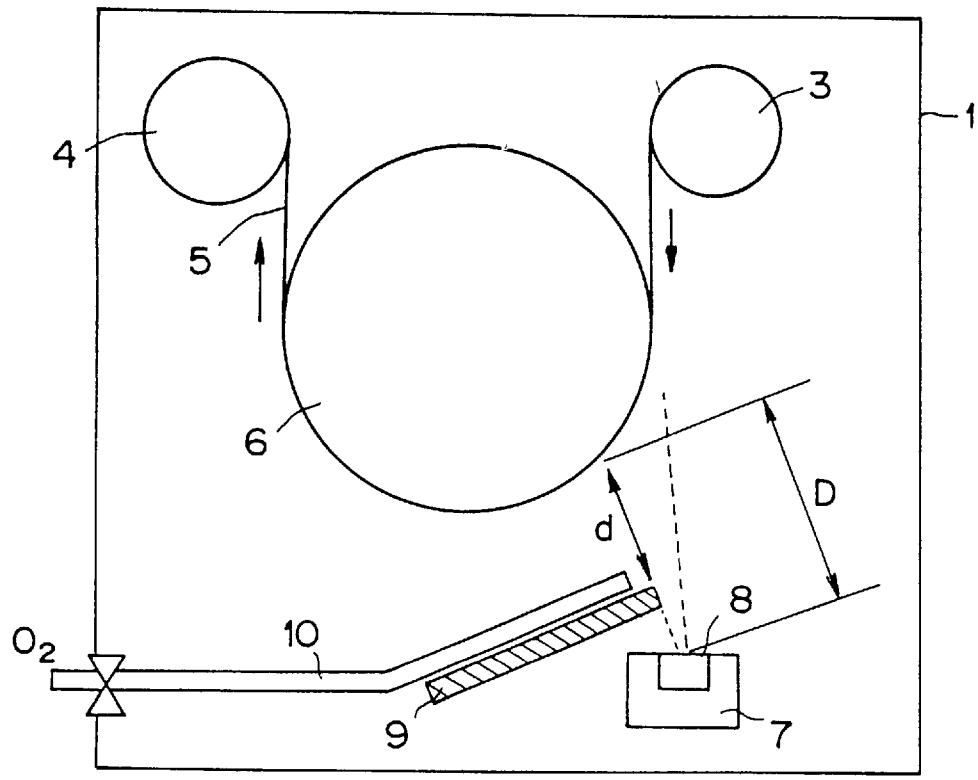
FIG. 2 is a schematic view showing an illustrative vapor deposition apparatus employed for preparation of a magnetic recording medium according to the present invention.

In FIG. 2, there is shown a continuous take-up vapor deposition apparatus for forming a thin magnetic metal film. According to the present invention, the thickness of the surface oxide layer of the thin magnetic metal film can be controlled by the position of the oxygen gas inlet at the time of vapor deposition.

The vapor deposition apparatus includes a vacuum chamber 30 maintained at high vacuum and accommodating therein a feed roll 3 rotated counterclockwise at a constant velocity and a take-up roll 4 rotated clockwise ar a constant velocity. A tape-shaped non-magnetic substrate 5 is adapted for travelling from the feed roll 3 to the take-up roll 4.

At a mid portion of a travel path of the non-magnetic substrate 5 from the feed roll towards the take-up roll 4 is mounted a cooling can 6 larger in diameter than the rolls 3, 4. The cooling can 6 is mounted for pulling out the non-magnetic substrate 5 downward in the drawing and is adapted for being rotated clockwise at a constant velocity. The feed roll 4, take-up roll 4 and the cooling can 6 are each in the form of a cylinder substantially equal in width and length to the non-magnetic substrate 5. Within the cooling can 6 is mounted a cooling device, not shown, for suppressing deformation of the non-magnetic substrate 5 otherwise caused by rise in temperature.

Thus the non-magnetic substrate 5 is sequentially fed out from the feed roll 3 so as to travel on the peripheral surface of the cooling can 6 in order to be taken up on the take-up roll 4. Within the vacuum chamber 1 is mounted a crucible 7 below the cooling can 6. The crucible 7, within which a magnetic metal material 8 is charged, is substantially equal in longitudinal width to the cooling can 6.

On the lateral surface of the vacuum chamber 1 is mounted an electron gun, not shown, for heating and evaporating the magnetic metal material charged within the crucible 7. The electron gun is mounted for radiating an electron beam therefrom to the magnetic metal material 8 within the crucible 7. The magnetic metal material 8, evaporated by the electron gun, is deposited as a magnetic layer on the non-magnetic substrate 5 travelling at a constant velocity on the peripheral surface of the cooling can 6.

Between the cooling can 6 and the crucible 7 is mounted a shutter 9 in the vicinity of the crucible 7. The shutter 9 is formed for covering a pre-set area of the non-magnetic substrate 5 adapted for travelling on the peripheral surface of the cooling can 6. The magnetic metal material 8, evaporated by the shutter 9, is deposited obliquely within a pre-set angular extent on the non-magnetic substrate 5.

With the present vacuum deposition apparatus, in oxygen gas inlet 10 is provided through the sidewall section of the vacuum chamber 1. The oxygen gas inlet 10 is provided in close proximity to the cooling can 6 between the shutter 9 and the cooling can 6, that is at a position proximate to the magnetic metal material 8 operating as an evaporation source. Part of the magnetic metal material evaporated from the evaporation source is oxidized by the oxygen gas supplied via the oxygen gas inlet 10 so as to be deposited on the surface of the non-magnetic substrate 5.

If the oxygen gas inlet 10 is mounted at a position spaced apart from the evaporation source, as in the conventional vapor deposition apparatus, and oxygen sufficient to confer the coercive force exceeding 10000 Oe to the thin magnetic metal film is to be introduced, a surface oxide layer, having the degree of oxidation higher at least 50% than that in the inside of the thin film, is produced to a thickness exceeding 5% of the total thickness of the thin magnetic metal film.

With the vapor deposition apparatus of the present embodiment, in which the oxygen gas inlet 10 is mounted in proximity to the evaporation source, it becomes possible to have oxygen contained in the inside of the thin film in an amount sufficient to raise the coercive force, while suppressing the thickness of the surface oxide layer to a smaller value, so that it becomes possible to provide a thin magnetic metal film which is superior electro-magnetic conversion characteristics and which is affected to a lesser extent by the surface oxide layer.

The thickness of the surface oxide layer, generated in the surface of the thin magnetic metal film, can be suppressed to a lower value by providing the oxygen gas inlet 10 at a position closer to the evaporation source. In effect, the position of the oxygen gas inlet 10, for which the thickness of the surface oxide layer may be suppressed to less than 5%, also differs with the amount of oxygen introduced via the oxygen gas inlet 10, so that the position is suitably selected by optimum trade-off. However, in selecting the position of the oxygen gas inlet 10 and the amount of oxygen introduced via the oxygen gas inlet 10, it is necessary to take account of the inherent objective of introducing oxygen into the atmosphere of vapor deposition, that is controlling the magnetic characteristics of the thin magnetic metal film. Even although the surface oxide layer is of a reduced thickness, sufficient coercivity cannot be achieved if the concentration of oxygen contained in the thin film is too small. It is for the coercive force of 10000 Oe at the minimum and for the rectangular ratio preferably exceeding 60% that a high playback output is produced. Thus it is preferred to adjust the position of the oxygen gas inlet 10 and the amount of oxygen introduced via the oxygen gas inlet 10 for achieving these magnetic characteristics.

For preventing the oxygen gas inlet 10 from being directly exposed to the metal vapor from the evaporation source, the oxygen gas inlet 10 is preferably arranged between the cooling can 6 and the shutter 9 so that the shutter 9 is interposed between the oxygen gas inlet 10 and the evaporation source.

As the above-mentioned thin magnetic metal film formed by vapor deposition, any of those routinely employed in the vapor-deposited magnetic recording medium may be employed. For example, thin magnetic metal films of the in-plane magnetic recording type, such as thin films of metals, such as Co, Fe or Ni, or thin films of alloys, such as Co—Ni based alloy, Co—Ni—Pt based alloy, Fe—Co—Ni based alloy, Fe—Ni—B based alloy, Fe—Co—B based alloy or Fe—Co—Ni—B based alloy, may be used. In addition, perpendicular magnetic recording type thin magnetic metal films, such as Co—Cr based alloy or Co—O based thin films, may also be employed. The magnetic layer may be of a single layer structure having a sole thin magnetic metal film or of a multi-layer structure having plural layers of the magnetic metal films.

On the magnetic layer, composed of the thin magnetic metal film(s), there may be formed a protective layer for improving running durability. The protective layer may be of carbon or a thin film of an inorganic material, such as $Al_2O_3$, Ti—N, Mo—C, Cr—C, SiO or $SiO_2$, formed by vacuum thin film forming technique, such as sputtering. The protective layer is preferably 20 nm or less and more preferably 10 nm or less in thickness for achieving sufficient protective effects and for preventing the playback output from being lowered due to the spacing loss otherwise caused by the protective layer.

The non-magnetic substrate, on which the thin magnetic metal film is formed, may be of commonly employed material. Examples of these materials include polyesters, such as polyethylene terephthalate, polyolefins, such as polyethylene or polypropylene, cellulose derivative, such as cellulose triacetate, cellulose diacetate or cellulose butyrate, vinyl resins, such as polyvinyl chloride or polyvinylidene chloride, and plastics, such as polycarbonate, polyimide or polyamide imide.

According to the present invention, the surface portion of a thin magnetic metal film in the magnetic recording medium, which thin magnetic metal film is formed as a magnetic layer by vapor deposition in an atmosphere of the introduced oxygen gas, has a surface oxide layer having the oxidation degree not lower than 50%, with the thickness of the surface oxide layer being 5% or less of the total thickness of the thin magnetic metal film. The oxidation degree on the order of 30% in the thin magnetic metal film is favorable in controlling the magnetic properties, such as coercivity. However, the oxidation degree of 50% or higher deteriorates the magnetic properties. If the thickness of the surface oxide layer having the degree of oxidation degree of 50% or more is suppressed to be 5% or less, a magnetic recording medium may be realized which has superior electromagnetic conversion characteristics and which is not affected by such deterioration in the magnetic properties.

EXAMPLES

The present invention will be explained based upon the results of experiments.

Experimental Example 1

In the present experimental example, analyses were made into the thickness of the surface oxide layer of the thin magnetic metal film.

A thin magnetic metal film of cobalt, having a film thickness of 200 nm, was formed on a polyethylene terephthalate (PET) base film by a continuous take-up type vapor deposition apparatus shown in FIG. 2. The distance d between the cooling can 6 and the oxygen gas inlet 10 and the amount of the oxygen gas introduced via the oxygen has inlet 10 were changed as shown in Table 1. The amount of the introduced oxygen gas was found by a previous experiment and is an amount of the introduced oxygen gas corresponding to the maximum playback output with the oxygen gas inlet 10 remaining mounted at the same position. The conditions of introduction of the oxygen gas for a sample tape 1-1 are pursuant to the conditions now in force. Other conditions for vapor deposition include the cooling can diameter of 600 mm, the degree of vacuum in the vacuum chamber of $10^{-9}$ atm, an evaporation source being a cobalt block, a distance D between the evaporation source and the cooling can being 300 mm, a vapor deposition incident angle of 90 to 45° relative to the normal line drawn to the non-magnetic substrate, the base film feed rate of 25 m/min and the vapor deposition means being an electron beam.

The film thickness of the thin magnetic metal film was controlled by adjusting the current intensity of the electron beam.

A back-coating paint, composed mainly of carbon, was coated on the surface of the base film opposite to the surface thereof having the thin magnetic metal film, for forming a back-coating layer. The resulting structure was then heat-treated.

On the thin magnetic metal film were coated 2,3-naphthalene diol as antiseptics and dimethyl stearylamine as lubricant and the resulting structure was cut to pre-set widths to prepare magnetic tapes (sample tapes 1-1 to 1-4) which were then accommodated in cassettes.

Of the magnetic tapes, thus prepared, the thickness of the surface oxide layers of the thin magnetic metal films, that is the portions of the surface layers of the thin magnetic metal films having the oxidation degree of 50% or higher, the mean oxidation degree in the thin film and the playback output, were measured.

The mean oxidation degree of the thin magnetic metal film herein means the concentration ratio of oxygen to the magnetic metal, herein cobalt, as found by an Auger electron spectrometer. The playback output was measured using a remodelled high-band 8 mm video deck manufactured by SONY CORPORATION under the trade name of EV-S900. The measurement conditions for the playback output were set so that the relative velocity between the magnetic tape and the magnetic head was 3.8 m/sec, the recording frequency was 7 MHz and the recording current was such current for which the maximum playback output could be obtained for the respective magnetic tapes.

Figure 3:
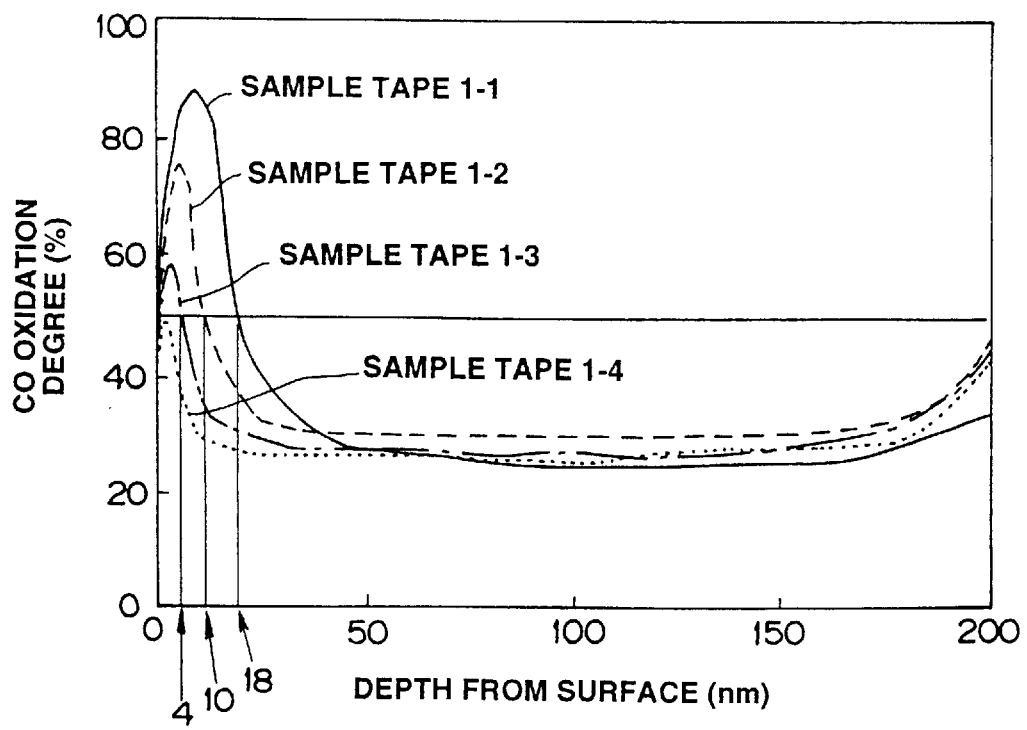
FIG. 3 is a graph showing the distribution of the degree of oxidation along the depth of the thin magnetic metal film.
Figure 4:
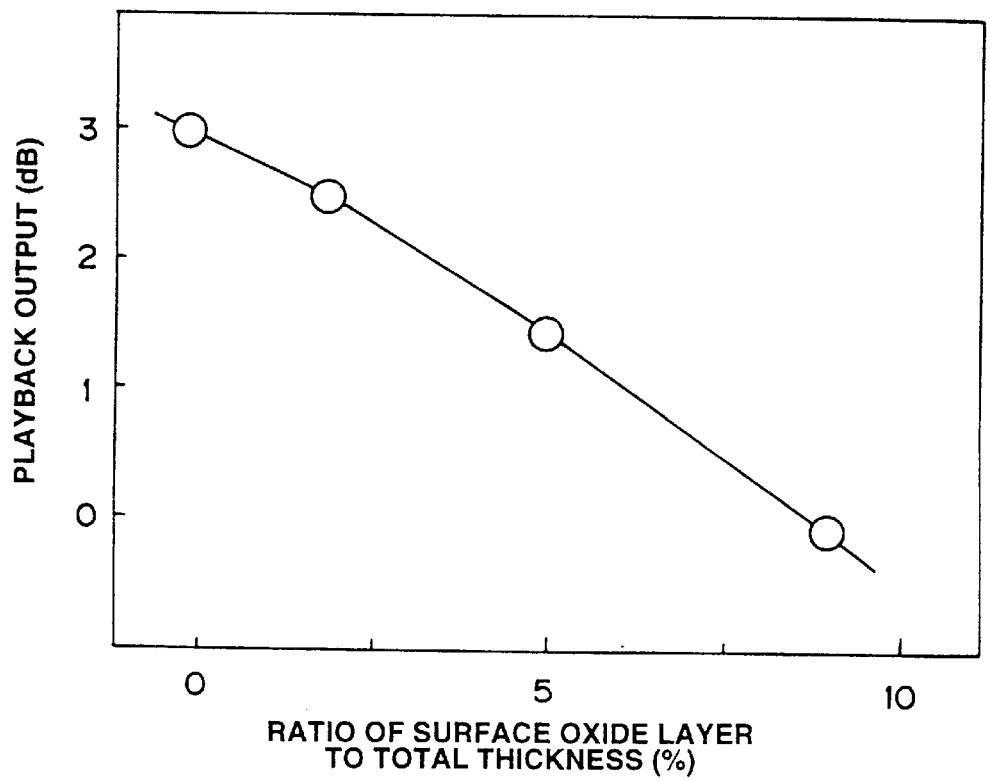
FIG. 4 is a graph showing the relation between the ratio of the surface oxide layer and the playback output.

The distribution of the oxidation degree in a direction along the depth of the respective thin magnetic films is shown in FIG. 3, while the results of measurement of the mean oxidation degree in the inside of the thin films and the playback output are shown in Table 2. The relation between the percentage of the thickness of the surface oxide layer to the total thickness of the magnetic thin film and the payback output is shown in FIG. 4.

TABLE 1

| | Oxygen Gas Introducing Conditions | | Mean |
| --- | --- | --- | --- |
| | Position d of Inlet (mm) | Amount of Introduced Oxygen Gas (cc/min) | Oxidation Degree in Film (%) |
| Sample Tape 1–1 | 10 | 500 | 27 |
| Sample Tape 1–2 | 50 | 400 | 28 |
| Sample Tape 1–3 | 100 | 300 | 29 |
| Sample Tape 1–4 | 200 | 150 | 28 |

TABLE 2

| | Surface Oxide Layer | | Playback |
| --- | --- | --- | --- |
| | Thickness (nm) | Ratio to Total Thickness (%) | Output (dB) |
| Sample Tape 1–1 | 18 | 9 | 0 |
| Sample Tape 1–2 | 10 | 5 | +1.5 |
| Sample Tape 1–3 | 4 | 2 | +2.6 |
| Sample Tape 1–4 | 0 | 0 | +3.0 |

The amount of the introduced oxygen gas of table 1 is the amount of the introduced oxygen gas corresponding to the maximum playback output of the magnetic tape. This amount of the introduced oxygen gas becomes the smaller the larger the distance d between the oxygen gas inlet and the cooling can, that is the closer the position of the oxygen gas inlet to the evaporation source.

If reference is had to FIG. 3 showing the distribution of the oxidation degree along the depth of the thin magnetic metal film formed as the oxygen gas was introduced in the amount shown in Table 1, it is seen that, although the mean oxidation degree in the inside of the thin film is on the same order of magnitude for the respective tapes, the thickness of the surface oxide layer differs with the position of the oxygen gas inlet. The thickness of the surface oxide layer having the oxidation degree of 50% or higher becomes the thinner the closer the position of the oxygen gas inlet to the evaporation source.

It is also seen from FIG. 4 that the thickness of the surface oxide layer is correlated with the playback output of the magnetic tape such that the playback output of the magnetic tape becomes the larger the lesser the thickness of the surface oxide layer. In particular, if the thickness of the surface oxide layer is 5% or less of the total thickness of the thin magnetic metal film, a larger playback output is obtained which is 1.5 dB higher than that of the sample tape 1-1 having a thickness of the surface oxide layer of 18 mm, which accounts for 9% of the total thickness of the thin magnetic metal film.

It is seen from this that the thickness of the surface oxide layer of the thin magnetic metal film of 5% or less is effective to improve the playback output in a vapor deposited type magnetic recording medium.

It is also seen that the thickness of the surface oxide layer of the thin magnetic metal film can be adjusted by controlling the position of the oxygen gas inlet configured for introducing the oxygen gas into the vapor deposition atmosphere, such that the surface oxide film may be reduced in thickness by arranging the oxygen gas inlet proximate to the evaporation source.

Experimental Example 2

In the present experimental example, analyses were made into the coercivity and the rectangular ratio of the thin magnetic metal film and the playback output.

A number of magnetic tapes (sample tapes 2-1 to 2-18) were prepared in the same way as in Experimental Example 1 except that the distance d between the cooling can and the oxygen gas inlet and the amount of the introduced oxygen gas at the time of deposition of the thin magnetic metal film were changed as shown in Table 3. The amount of the introduced oxygen gas is the amount corresponding to the maximum playback output for the same disposition of the oxygen gas inlet.

Of the magnetic tape samples, thus prepared, measurements were made of the thickness of the surface oxide layer of the thin magnetic metal film, the mean oxidation degree in the inside of the thin film, rectangular ratio and the playback output.

The coercivity and the rectangular ratio were measured using a vibration sample magnetometer (VSM). The measurement conditions for the mean oxidation degree of the thin magnetic metal film and the playback output were the same as those of the Experimental Example 1.

Figure 6:
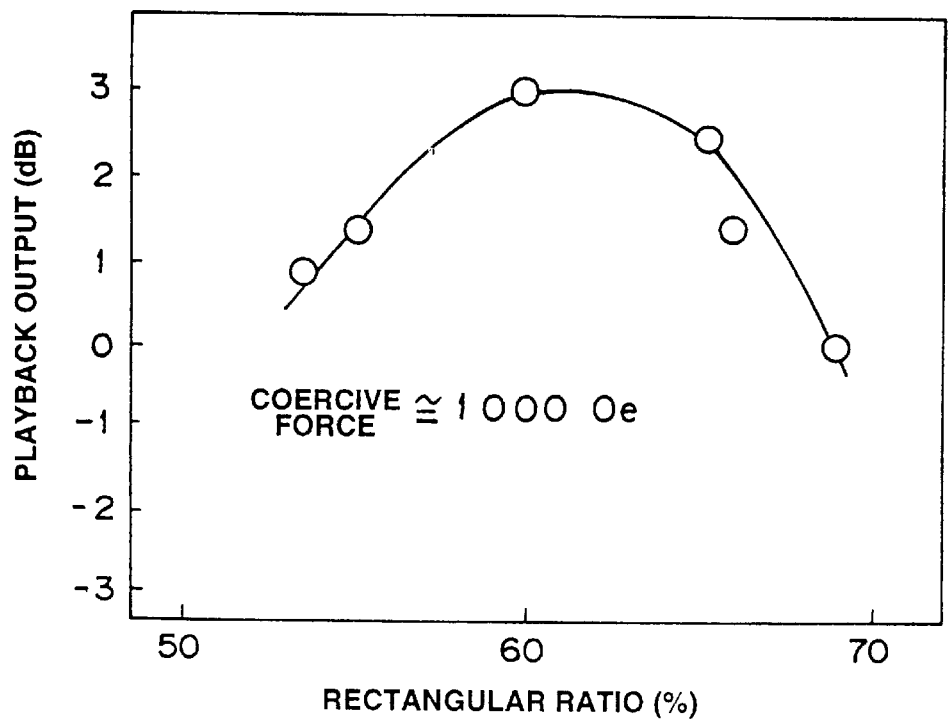
FIG. 6 is a graph showing the relation between the rectangular ratio and the playback output.

The measured results are shown in Table 4. The relation between the thickness of the surface oxide layer and the playback output and the relation between the rectangular ratio and the playback output are shown in FIGS. 4 and 6, respectively.

TABLE 3

|  | Oxygen Gas Introducing Condition | |
|---|---|---|
|  | Position d of Inlet (mm) | Amount of Introduced Oxygen Gas (cc/min) |
| Sample Tape 2–1 | 10 | 390 |
| Sample Tape 2–2 | 10 | 450 |
| Sample Tape 2–3 | 10 | 500 |
| Sample Tape 2–4 | 50 | 290 |
| Sample Tape 2–5 | 50 | 360 |
| Sample Tape 2–6 | 50 | 400 |
| Sample Tape 2–7 | 100 | 200 |
| Sample Tape 2–8 | 100 | 270 |
| Sample Tape 2–9 | 100 | 300 |
| Sample Tape 2–10 | 200 | 60 |
| Sample Tape 2–11 | 200 | 110 |
| Sample Tape 2–12 | 200 | 150 |
| Sample Tape 2–13 | 230 | 50 |
| Sample Tape 2–14 | 230 | 100 |
| Sample Tape 2–15 | 230 | 140 |
| Sample Tape 2–16 | 270 | 50 |
| Sample Tape 2–17 | 270 | 90 |
| Sample Tape 2–18 | 270 | 130 |

TABLE 4

|  | Ratio of Surface Oxide Layer to Total Thickness (%) | Coercive Force (Oe) | Rectangular Ratio (%) | Playback Output (dB) |
|---|---|---|---|---|
| Sample Tape 2–1 | 1 | 800 | 66 | −2.4 |
| Sample Tape 2–2 | 5 | 890 | 70 | −2.3 |
| Sample Tape 2–3 | 9 | 1040 | 69 | 0 |
| Sample Tape 2–4 | 1 | 790 | 64 | −2.0 |
| Sample Tape 2–5 | 3 | 900 | 66 | −1.0 |
| Sample Tape 2–6 | 5 | 1050 | 66 | +1.5 |
| Sample Tape 2–7 | 0 | 800 | 59 | −1.6 |
| Sample Tape 2–8 | 1 | 910 | 64 | −0.1 |
| Sample Tape 2–9 | 2 | 1040 | 65 | +2.6 |
| Sample Tape 2–10 | 0 | 810 | 54 | −1.0 |
| Sample Tape 2–11 | 0 | 910 | 58 | +0.2 |
| Sample Tape 2–12 | 0 | 1000 | 60 | +3.0 |
| Sample Tape 2–13 | 0 | 800 | 52 | −1.0 |
| Sample Tape 2–14 | 0 | 900 | 54 | 0 |
| Sample Tape 2–15 | 0 | 990 | 55 | +1.3 |
| Sample Tape 2–16 | 0 | 810 | 50 | −1.4 |
| Sample Tape 2–17 | 0 | 920 | 52 | −0.3 |
| Sample Tape 2–18 | 0 | 990 | 53 | +0.9 |

Figure 5:
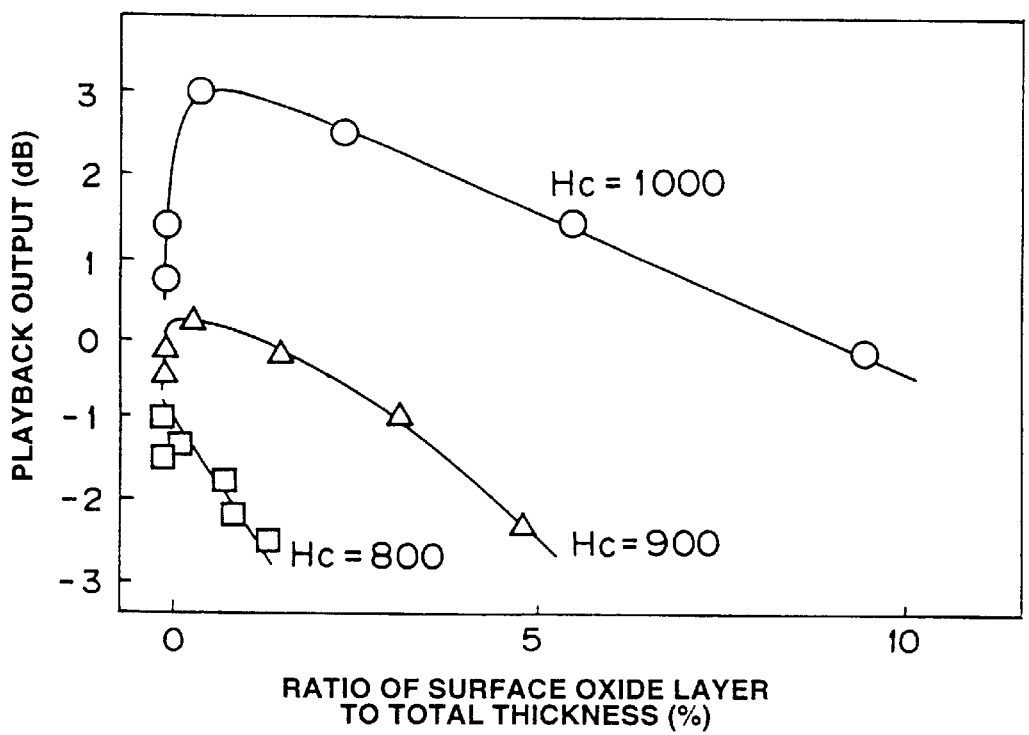
FIG. 5 is a graph showing the relation between the playback output and the ratio of the surface oxide layer in the magnetic tapes different in coercivity.

It is seen from FIG. 5 that, for any values of the coercive force, the thickness of the surface oxide layer is correlated with the playback output of the magnetic tape, such that, excepting the case in which the amount of introduced oxygen at the time of forming the thin magnetic metal film is extremely small and is on the order of 100 cc/min, the playback output becomes the larger the smaller the thickness of the surface oxide layer. However, if the coercive force is 1000 Oe or less, only the low playback output not higher than 0 dB is produced, even if the thickness of the surface oxide layer is changed.

It is also seen from FIG. 6 that the playback output is also changed with the rectangular ratio, such that, if the rectangular ratio is low and is lower than 60%, a sufficient playback output is not produced, and the larger value of the playback output is achieved for the rectangular ratio of 60% or higher. The decreased playback output for the rectangular ratio of 65% or higher in FIG. 6 is ascribable to the thick surface oxide layer. That is, if the effect of the surface oxide layer is deducted, the playback output becomes the larger the higher the rectangular ratio.

It is seen from this that, for improving the playback output, it is desirable to reduce the thickness of the surface oxide layer to not more than 5% of the total thickness of the thin magnetic metal film as well as to maintain the coercivity and the rectangular ratio so as to be not less than 1000 Oe and not less than 60%, respectively.

Experimental Example 3

In the present Experimental Example, analyses were made into the effect of forming a protective layer on a magnetic layer.

A number of magnetic tapes (sample tapes 3-1 to 3-3) were prepared in the same way as in Experimental Example 1 except that a carbon protective film was formed on a magnetic layer to a film thickness of 2 nm.

Figure 7:
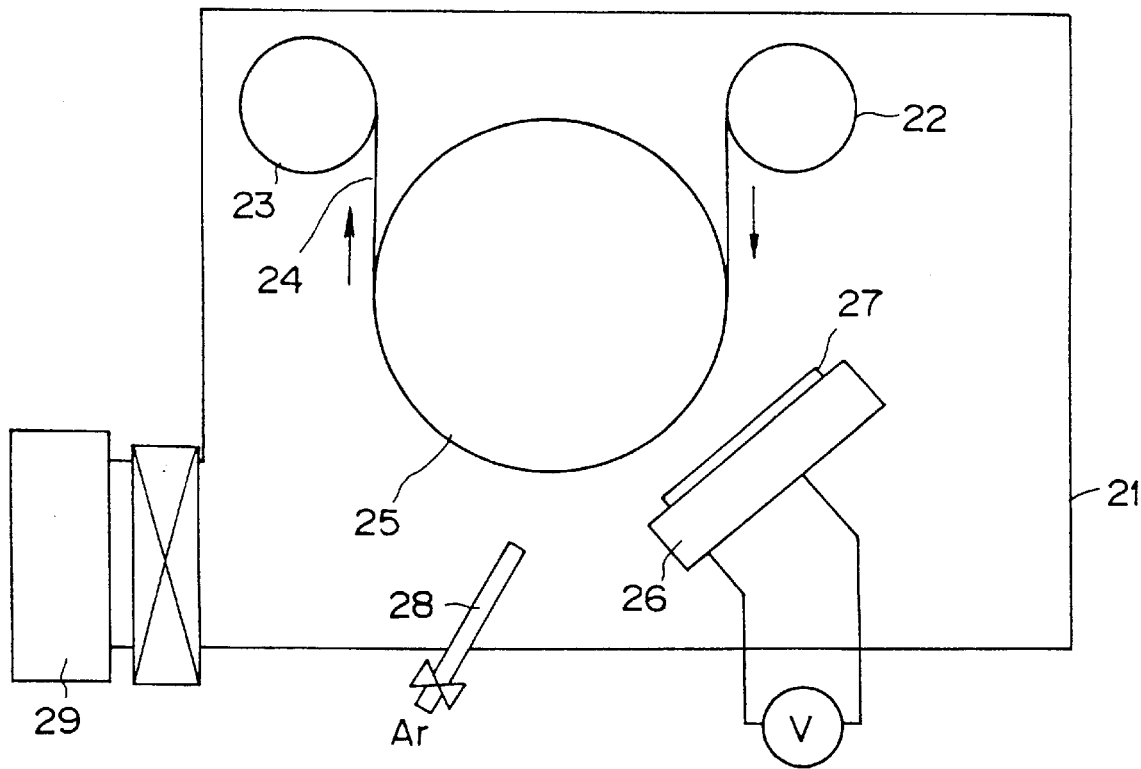
FIG. 7 is a schematic view showing a sputtering device for forming a protective film.

The carbon protective film was formed using a sputtering device shown in FIG. 7.

The vapor deposition apparatus includes a vacuum chamber 21 maintained at high vacuum and accommodating therein a feed roll 22 rotated counterclockwise at a constant velocity and a take-up roll 23 rotated clockwise ar a constant velocity. A tape-shaped non-magnetic substrate 24 is adapted for travelling from the feed roll 22 to the take-up roll 23.

At a mid portion of a travel path of the non-magnetic substrate 24 from the feed roll 22 towards the take-up roll 23 is mounted a sputtering anode can 25 larger in diameter than the rolls 22, 23. The sputtering anode can 25, functioning as an anode for producing glow discharge, is mounted for pulling out the non-magnetic substrate 24 downward and is adapted for being rotated clockwise in the drawing at a constant velocity.

The feed roll 22, take-up roll 23 and the sputtering anode can 25 are each in the form of a cylinder substantially equal in width and length to the non-magnetic substrate 24. Within the cooling can 6 is mounted a cooling device, not shown, for suppressing deformation of the non-magnetic substrate 24 otherwise caused by rise in temperature.

Within the vacuum chamber 21 is mounted a plate-shaped sputtering cathode section 26 connected to a dc source. The sputtering cathode section 26 is mounted below and facing the sputtering anode can 25. On the upper surface of the sputtering cathode section 26 is secured a target 27. A sputtering gas inlet 28 is provided through the sidewall for being protruded into the vacuum chamber 21.

Into the vacuum chamber 21 of the sputtering device, a sputtering gas is introduced into the vacuum chamber 21 via the sputtering gas inlet 28, at the same time as an electrical voltage is applied across the sputtering cathode section 26 and the sputtering anode can 25 for producing glow discharge. This ionizes the sputtering gas introduced into the vacuum chamber 21 so as to impinge on the surface of the target 27 secured to the sputtering cathode section 26 for striking out the sputtering particles. The sputtering particles, thus struck out, are deposited on the thin magnetic metal film surface to produce a sputtering film. The sputtering conditions employed in the present Example were: the sputtering system, DC magnetron sputtering, pre-sputtering vacuum degree, $10^{-4}$ Pa; vacuum degree during sputtering, 0.8 Pa; sputtering gas, Ar gas; cooling can temperature, −20° C.; sputtering voltage, 600 V; sputtering current, 10 A; tape feed velocity, 6 m/min.

A number of magnetic tapes having protective films thus prepared (sample tapes 3-1 to 3-3) and the magnetic tapes not having the protective tapes prepared in the same way as in Experimental Example 1 (sample tapes 1-1 to 1-4), were checked as to durability at the time of still picture reproduction (still durability).

The still durability was evaluated by still-reproducing the sample tapes using a remodelled high-band 8 mm video deck, manufactured by SONY CORPORATION under the trade name of EV-S900 and measuring the time the playback output was lowered by 3 dB from the initial value (still durability time). The measurement conditions were set so that the relative velocity was 3.8 m/sec and the recording frequency was 7 MHz. Measurement was terminated in 120 minutes. The results are shown in Table 5.

TABLE 5

|  | Ratio of Surface Oxide Layer to Total Thickness (%) | Presence or Absence of Carbon Protective Layer | Still Durability Time (min) |
| --- | --- | --- | --- |
| Sample Tape 1–1 | 9 | Absent | 110 |
| Sample Tape 1–2 | 5 | Absent | 64 |
| Sample Tape 1–3 | 2 | Absent | 16 |
| Sample Tape 1–4 | 0 | Absent | 7 |
| Sample Tape 3–1 | 5 | Present | >120 |
| Sample Tape 3–2 | 2 | Present | >120 |
| Sample Tape 3–3 | 0 | Present | >120 |

If the magnetic tapes not having the carbon protective films (sample tapes 1-1 to 1-4) in Table 5 are compared to one another, it is seen that the still durability time becomes the shorter the thinner the thickness of the surface oxide layer. Thus it is seen that the surface oxide layer performs the function of a protective film. On the other hand, comparison among the magnetic tapes having the carbon protective films reveals that the still durability time is long and is 120 minutes or longer irrespective of the thickness of the surface oxide layer.

Thus it is seen that the carbon protective film sufficiently compensates the loss in still durability caused on reducing the thickness of the surface oxide layer.

Although the above description of the present invention has been made of an example of a single-layer magnetic recording medium having a mono-layer thin magnetic metal film, similar effects may be achieved if the present invention is applied to a magnetic recording medium having a multi-layer structure magnetic layer.

What is claimed is:

1. A magnetic recording medium comprising;

a non-magnetic substrate having an upper surface coated with a magnetic layer, the magnetic layer comprising a plurality of alternating lower magnetic metal thin film layers and upper surface oxide layers, each lower magnetic metal thin film layer comprising a magnetic metal and at least one oxide of the magnetic metal, each upper surface oxide layer comprising the magnetic metal and at least one oxide of the magnetic metal, each upper surface oxide layer having a molar concentration ratio of oxygen atoms to magnetic metal atoms of at least 0.5 and, each lower magnetic thin film layer having a molar concentration ratio of oxygen atoms to magnetic metal atoms of about 0.3, the magnetic layer having a first thickness, the surface oxide layers combining to have a second thickness, the ratio of the second thickness to the first thickness being 0.05 or less, the magnetic recording medium having a coercivity of at least 1000 Oe and a rectangular ratio of at least 60%.

2. The magnetic recording medium of claim 1 further comprising a protective layer disposed on top of the magnetic layer.

3. The magnetic recording medium of claim 2 wherein the protective layer comprises an inorganic substance.

4. The magnetic recording medium of claim 2 wherein the protective layer comprises carbon.

5. The magnetic recording medium of claim 2 wherein the protective layer has a thickness less than 20 nm.

6. The magnetic recording medium of claim 2 wherein the protective layer has a thickness less than 10 nm.

* * * * *